(12) United States Patent
Cai et al.

(10) Patent No.: US 10,824,812 B2
(45) Date of Patent: Nov. 3, 2020

(54) METHOD AND APPARATUS FOR INFORMATIVE TRAINING REPOSITORY BUILDING IN SENTIMENT ANALYSIS MODEL LEARNING AND CUSTOMIZATION

(71) Applicant: International Business Machines Corporation, Armonk, NY (US)

(72) Inventors: Keke Cai, Beijing (CN); HongLei Guo, Beijing (CN); Jian Min Jiang, Beijing (CN); Zhong Su, Beijing (CN); Changhua Sun, Beijing (CN); Guoyu Tang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 970 days.

(21) Appl. No.: 15/175,808

(22) Filed: Jun. 7, 2016

(65) Prior Publication Data
US 2017/0351971 A1    Dec. 7, 2017

(51) Int. Cl.
*G06F 40/30* (2020.01)
*G06Q 30/02* (2012.01)

(52) U.S. Cl.
CPC .............. *G06F 40/30* (2020.01); *G06Q 30/02* (2013.01)

(58) Field of Classification Search
CPC .......................... G06F 17/2785; G06F 17/2775
See application file for complete search history.

(56) References Cited

U.S. PATENT DOCUMENTS

| 7,987,188 B2 | 7/2011 | Neylon et al. |
| 8,356,025 B2 * | 1/2013 | Cai ............... G06F 17/2785 |
| | | 707/708 |
| 8,417,713 B1 * | 4/2013 | Blair-Goldensohn ....... |
| | | G06F 16/335 |
| | | 707/751 |

(Continued)

FOREIGN PATENT DOCUMENTS

CN    103207855 A    7/2013

OTHER PUBLICATIONS

Borss, Jurgen et al "Terminology Extraction Approaches for Product Aspect Detection in Customer Reviews." 17th CNLL [Published 2013] [Retrieved online Aug. 2019] <URL: https://www.aclweb.org/anthology/W13-3524> (Year: 2013).*

(Continued)

*Primary Examiner* — Ann J Lo
*Assistant Examiner* — Fen Christopher Tamulonis
(74) *Attorney, Agent, or Firm* — Scully, Scott, Murphy & Presser, P.C.; Joseph Petrokaitis

(57) ABSTRACT

The methods, systems, and computer program products described herein provide ways to generate an informative training corpus of samples for use in machine training a high-quality sentiment analysis computer model. In some aspects, a method is disclosed including receiving a plurality of training samples, extracting semantic and sentiment elements of one or more of the training samples, generalizing the semantic and sentiment elements of the one or more of the training samples, generating an informative ranking score for one or more of the training samples based on the (Continued)

generalized semantic and sentiment elements, selecting informative training samples from the plurality of training samples based at least in part on the generated informative ranking scores, and adding the selected informative training samples to an informative training corpus.

20 Claims, 6 Drawing Sheets

(56) References Cited

U.S. PATENT DOCUMENTS

| | | | | |
|---|---|---|---|---|
| 8,838,438 | B2* | 9/2014 | Leary | G06F 17/274 |
| | | | | 704/9 |
| 8,949,211 | B2 | 2/2015 | Lu et al. | |
| 9,015,035 | B2 | 4/2015 | Djordjevic et al. | |
| 9,633,007 | B1* | 4/2017 | Brun | G06F 17/2785 |
| 2009/0048823 | A1* | 2/2009 | Liu | G06F 17/2745 |
| | | | | 704/9 |
| 2009/0193328 | A1* | 7/2009 | Reis | G06F 16/345 |
| | | | | 715/231 |
| 2015/0170051 | A1 | 6/2015 | Bufe, III et al. | |
| 2015/0278195 | A1 | 10/2015 | Yang et al. | |
| 2016/0350651 | A1* | 12/2016 | Devarajan | G06N 3/08 |

OTHER PUBLICATIONS

Liu, JingJing et al. "Review sentiment scoring via a parse-and-paraphrase paradigm." EMNLP '09 [Published 2009] [Retrieved Aug. 2019] <URL: https://dl.acm.org/citation.cfm?id=1699532> (Year: 2009).*

Choi, Y. et al. "Domain-specific Sentiment Analysis using Contextual Feature Generation", Korea Advanced Institute of Science and Technology, Nov. 6, 2009, pp. 1-8, Hong Kong, China.

Liu, J., "Feature-based Sentiment Analysis on Android App Reviews Using SAS Text Miner and SAS Sentiment Analysis Studio", SAS Global Forum 2013 Poster and Video Presentations, 2013, pp. 1-7, Oklahoma State University, Stillwater, OK, USA.

"Creating a Sentiment Analysis Model", https://cloud.google.com/prediction/docs/sentiment analysis, pp. 1-5, printed Jun. 6, 2016.

Anonymous, "Method and System of Dynamic Sentiment Analysis with Domain Category", IP.com Prior Art Database Technical Disclosure, May 9, 2011, pp. 1-4.

* cited by examiner

INFORMATIVE SAMPLING
─ 276

STFV(SAMPLE)={
SENTIMENTTOPIC1: (PRODUCT X: ASPECT: OVERVIEW, GOOD : GROUP1, LSAC (SENTIMENTTOPIC1))
SENTIMENTTOPIC2: (TASTE: ASPECT: TASTY, CRISPY: GROUP2, LSAC(SENTIMENTTOPIC2))
SENTIMENTTOPIC3: (TOMATO FLAVOR: ASPECT: TASTY, STRONG: GROUP2, LSAC(SENTIMENTTOPIC3))
SENTIMENTTOPIC4: (PRICE: ASPECT: PRICE, AFFORDABLE: GROUP3, LSAC (SENTIMENTTOPIC4))
SENTIMENTTOPIC5: (COST PERFORMANCE: ASPECT: PRICE, GREAT: GROUP1, LSAC (SENTIMENTTOPIC5))
SENTIMENTTOPIC6: (EDGE: ASPECT: PACKAGE, DEFORMED: GROUP4, LSAC (SENTIMENTTOPIC6))
SENTIMENTTOPIC7: (BOX: ASPECT: PACKAGE, BROKEN: GROUP4, LSAC (SENTIMENTTOPIC7))
}
   278      280      282      284      286    288

FIG. 4

METHOD AND APPARATUS FOR INFORMATIVE TRAINING REPOSITORY BUILDING IN SENTIMENT ANALYSIS MODEL LEARNING AND CUSTOMIZATION

FIELD

The present application relates generally to sentiment analysis, and more particularly to autonomously building an informative training corpus of training samples for use in machine training and customizing sentiment analysis computer models.

BACKGROUND

Sentiment analysis, also known as opinion mining, is used to process textual data to determine an attitude or opinion of an author of the textual data. A sentiment analysis computer model may be trained to determine the sentiment of textual data in a particular field. For example, the sentiment analysis computer model may be trained to process consumer reviews of a product to determine the customer's sentiment about the product. To train a high-quality sentiment analysis computer model, manual selection of training samples and manual labeling of data in the training samples is often required. Customizing a sentiment analysis computer model to target a specific domain may also require expert support to select specific training samples for tuning the model.

BRIEF SUMMARY

The methods, systems, and computer program products described herein provide ways to autonomously generate an informative training corpus of samples for use in machine training a high-quality sentiment analysis computer model.

In an aspect of the present disclosure, a method is disclosed including receiving a plurality of training samples, extracting semantic and sentiment elements of one or more of the training samples, generalizing the extracted semantic and sentiment elements of the one or more of the training samples, generating an informative ranking score for one or more of the training samples based on the generalized semantic and sentiment elements, selecting informative training samples from the plurality of training samples based at least in part on the generated informative ranking scores, adding the selected informative training samples to an informative training corpus, and storing the informative training corpus in a database repository on a storage device.

In aspects of the present disclosure apparatus, systems, and computer program products in accordance with the above aspect may also be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 4 is diagram illustrating an informative sampling in accordance with an embodiment of the present disclosure.

DETAILED DESCRIPTION

Figure 1:
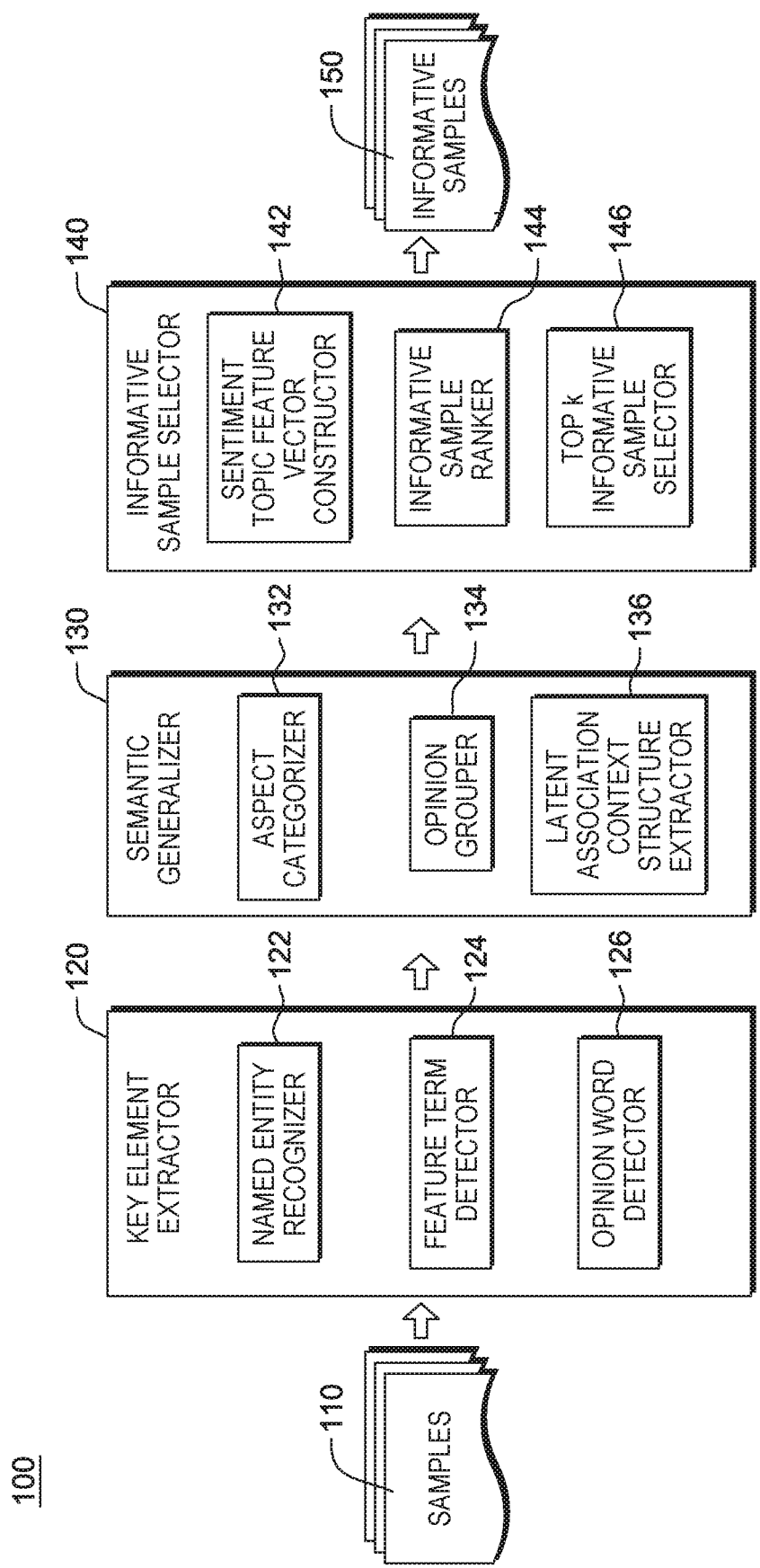
FIG. 1 is a system diagram of a system for generating a training corpus in accordance with an embodiment of the present disclosure.

Machine training a high-quality sentiment analysis computer model often requires a significant amount of hands on human effort to select and label training samples. For example, when determining what samples to use for machine training the sentiment analysis computer model, humans may be required to review potential samples, determine the sentiments associated with each of the samples, and label the samples. Such a process may be both time consuming and labor intensive. For example, when large volumes of potential samples are available, only a random portion of the available samples may be selected for review by humans. Such a random sampling may lead to a lower overall confidence level that the sentiment analysis computer model will determine the sentiment of a particular item of textual data correctly.

The methods, systems, and computer program products of the present disclosure provide ways to autonomously generate an informative training corpus of samples for use in training sentiment analysis computer models without requiring a human to review and label each sample.

With reference to FIGS. 1-4, a training corpus generating system 100 includes samples 110, key element extractor 120, semantic generalizer 130, informative sample selector 140, and informative samples 150.

Figure 2:
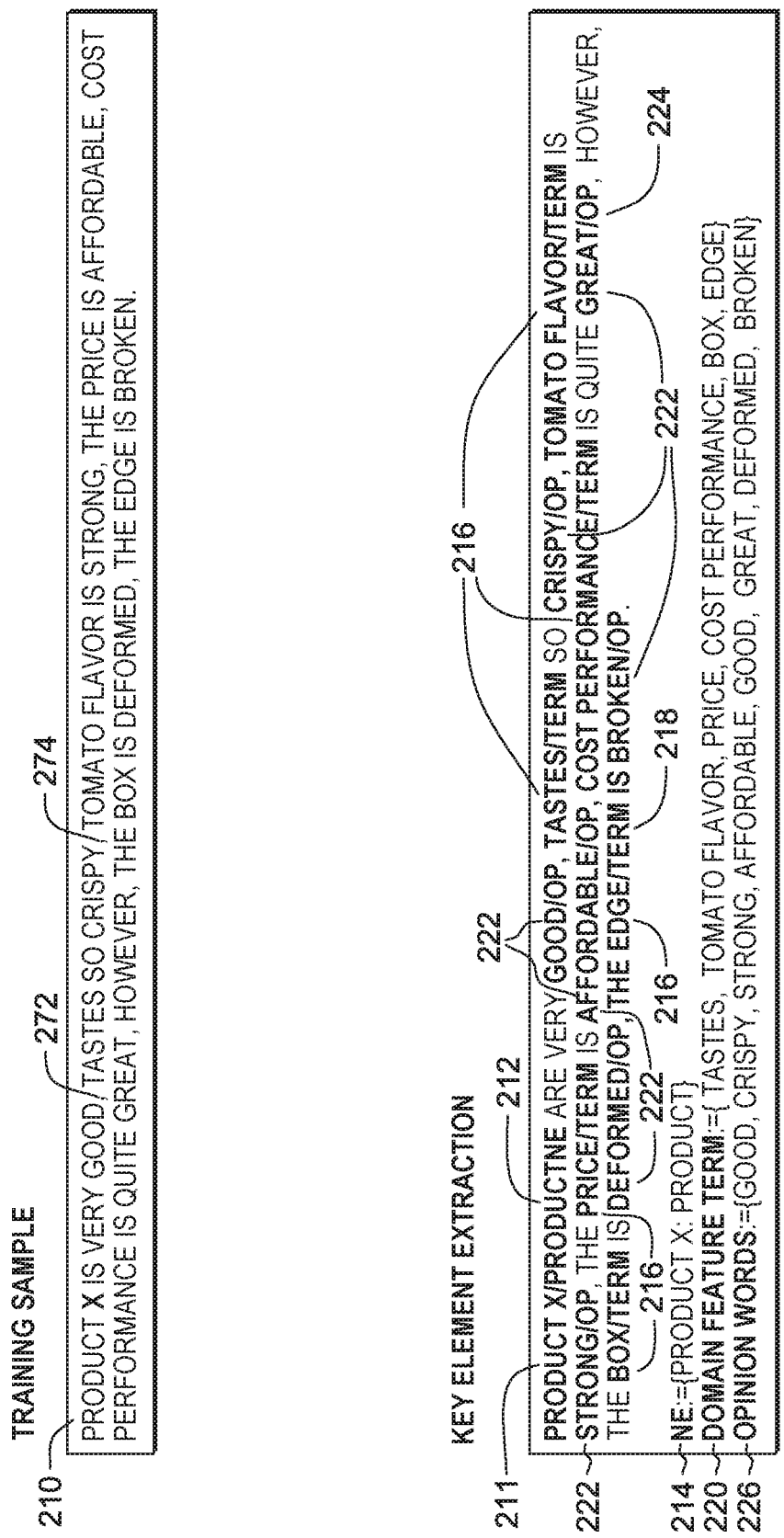
FIG. 2 is diagram illustrating a training sample and key element extraction in accordance with an embodiment of the present disclosure.

Samples 110 may include any textual data on which sentiment analysis may be performed. For example, samples 110 may be consumer product reviews, blog posts, social media posts, troubleshooting tickets, service inquiries, third party product reviews, media publications, or any other source of textual data that may be of interest. In some embodiments, samples 110 may be a random selection of samples from a larger samples set. With reference to FIG. 2, an example sample 210 is illustrated.

Referring back to FIG. 1, key element extractor 120 is configured to analyze samples 110 to detect key semantic and sentiment elements in the samples. Key element extractor 120 may include a named entity recognizer 122, feature term detector 124, and opinion word detector 126.

Named entity recognizer 122 is configured to analyze samples 110 to identify the named or nominal entities that are the subject of samples 110. Non-limiting examples of named or nominal entities include brand names, company names, trademarks, products, services, people, places, or any other entity that may be the subject of samples 110. For example, as illustrated in FIG. 2, name entity recognizer 122 may identify "Product X" as the entity 211 in sample 210. Name entity recognizer 122 may identify the entity 211, for example, using commonly available string matching algorithms or programs to parse the text of the textual data. In some embodiments, name entity recognizer 122 may use a name entity recognition (NER) engine such as, for example, OpenNLP™ available from The Apache® Software Foundation. Name entity recognizer 122 may analyze each word of sample 210 individually, may analyze combinations of words, or both, to determine the entity 211. In some embodiments, for example, name entity recognizer 122 may include or have access to a list or database of relevant entities and may compare the list of entities to the textual data to identify the entity 211 in sample 210. As further illustrated in FIG. 2, name entity recognizer 122 may append a tag 212 to the identified entity 211 and may generate a data structure 214 including the entity (e.g., Product X) and a category of the entity (e.g., product). In some embodiments, name entity recognizer 122 may analyze samples 110 autonomously to identify the named or nominal entities without further human input.

Feature term detector 124 is configured to analyze samples 110 to identify features of the entity for which there may be an opinion. Some non-limiting examples of features may include sensory terms, for example, taste, smell, looks, or other sensory terms. Some non-limiting examples of features may include descriptive terms, for example, flavour, price, cost performance, box, edge, or any other descriptive term about the entity that is the subject of the sample 110. For example, as illustrated in FIG. 2, feature term detector 124 may identify features 216 as terms for the entity. Feature term detector 124 may identify the features 216, for example, using commonly available string matching algorithms or programs to parse the text of the textual data. In some embodiments, feature term detector 124 may use a NER. Feature term detector 124 may analyze each word in the sample individually, may analyze combinations of words, or both, to identify features 216 in sample 210. In some embodiments, for example, feature term detector 124 may include or have access to a list or database of relevant features and may compare the list of features to the textual data of sample 210 to identify features 216 in sample 210. As further illustrated in FIG. 2, feature term detector 124 may append a tag 218 to the identified features 216 and may generate a data structure 220 including the features identified in sample 210, for example, tastes, tomato flavour, price, cost performance, box, and edge. In some embodiments, name feature term detector 124 may analyze samples 110 autonomously to identify the features without further human input.

Opinion word detector 126 is configured to analyze samples 110 to identify opinion words about the entity. In some embodiments, each feature 216 identified by feature term detector 124 may include a corresponding opinion word. In some embodiments there may be more or less opinion words than features 216. As illustrated in FIG. 2, opinion word detector 126 may identify opinion words 222 as opinions about the entity. Opinion word detector 126 may identify the opinion words 222, for example, using commonly available string matching algorithms or programs to parse the text of the textual data. In some embodiments, opinion word detector 124 may use a NER. Opinion word detector 126 may analyze each word in the sample individually, may analyze combinations of words, or both, to identify opinion words 222 in sample 210. For example, opinion word detector 126 may analyze sample 210 and identify opinion words 222 including, for example, good, crispy, strong, affordable, great, deformed, and broken. In some embodiments, for example, opinion word detector 126 may include or have access to a list or database of relevant opinion words and may compare the list of opinion words to the textual data of sample 210 to identify the opinion words in sample 210. As further illustrated in FIG. 2, opinion word detector 126 may append a tag 224 to the identified opinion words 222 and may generate a data structure 226 including the opinion words identified in sample 210, for example, good, crispy, strong, affordable, good, great, deformed, and broken. In some embodiments, name opinion word detector 126 may analyze samples 110 autonomously to identify the opinion words without further human input.

Referring back to FIG. 1, semantic generalizer 130 is configured to analyze the output of key element extractor 120 and to generalize the semantic and sentiment elements by categorizing, grouping, and correlating the identified entity, features, and opinion words together. Semantic generalizer 130 may include an aspect categorizer 132, an opinion grouper 134, and a latent semantic association context structure (LSAC) extractor 136.

Figure 3:
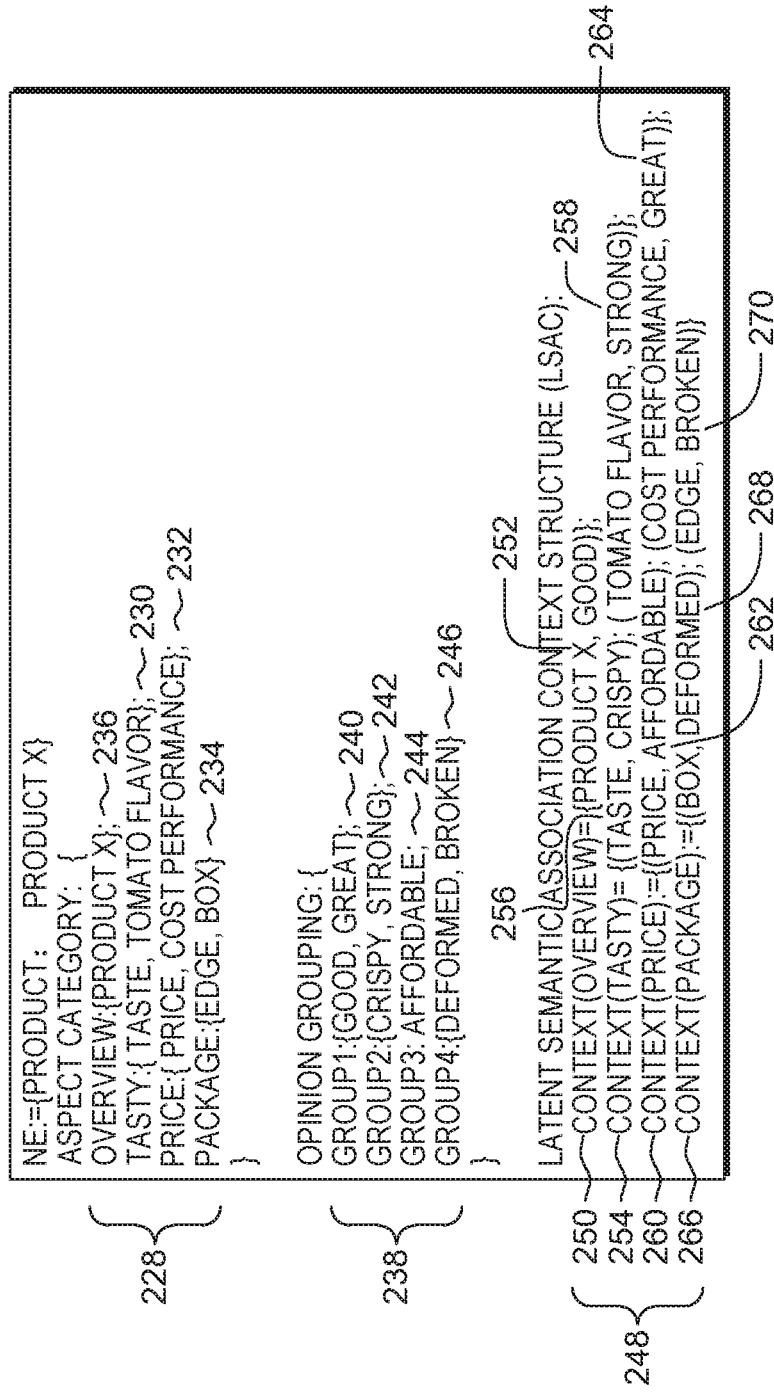
FIG. 3 is diagram illustrating semantic generalization in accordance with an embodiment of the present disclosure.

Aspect categorizer 132 is configured to analyze samples 110, the entity identified by named entity recognizer 122, the features 216 identified by feature term detector 124, and the opinion words 222 identified by opinion word detector 126 to categorize aspects of the sample 110. With reference to FIGS. 2 and 3, for example, aspect categorizer 132 determines aspect categories 228 for each of the features 216 identified by feature term detector 124. For example, the features 216 of "taste" and "tomato flavour" may be grouped into the aspect category 230 of "tasty," the features 216 of "price" and "cost performance" may be grouped into the aspect category 232 of "price," and the features 216 "edge" and "box" may be grouped into the aspect category 234 of "package". In some embodiments aspect categorizer 132 may include or have access to a list or database of aspect categories including a list of features associated with each aspect category. In some embodiments, aspect categorizer 132 may compare the features identified by feature term detector 124 to the list of features associated with each aspect category to determine which category the identified feature belongs to. In some embodiments, aspect categorizer 132 may also determine an overview category 236 for the sample 210. For example, overview category 236 may include the entity 211, e.g., Product X. The associated opinion word 222 may be determined by parsing the sample 210, for example, based on sentence structure, punctuation marks, or any other ways of determining associations between words may be used including. In some embodiments, name aspect categorizer 132 may autonomously analyze samples 110, the entity identified by named entity recognizer 122, the features 216 identified by feature term detector 124, and the opinion words 222 identified by opinion word detector 126 to categorize aspects of the sample 110 without human input. In some embodiments, aspect categorizer 132 may autonomously analyze samples 110, the entity identified by named entity recognizer 122, the features 216 identified by feature term detector 124, and the opinion words 222 identified by opinion word detector 126 to categorize aspects of the sample 110 without further human input.

Opinion grouper 134 is configured to analyze the opinion words identified by opinion word detector 126 to categorize the opinion words into opinion groups 238. With reference to FIG. 3, for example, opinion grouper 134 determines opinion groups 238 for each of the opinion words 222 identified by opinion word detector 126. For example, the opinion words "good" and "great" may be determined to be in a first group 240, the opinion words "crispy" and "strong" may be determined to be in a second group 242, the opinion words "affordable" may be determined to be in a third group 244, and the opinion words "deformed" and "broken" may be determined to be in a fourth group 246. In some aspects, opinion words may be grouped together based on their meaning and/or context within a sentence. In some embodiments opinion grouper 134 may include or have access to a list or database of opinion groups including a list of opinion words associated with each group. In some embodiments, opinion grouper 134 may compare the opinion words identified by opinion word detector 126 to the list of opinion words associated with each opinion group to determine which group the identified feature belongs to. In some embodiments, opinion grouper 134 may autonomously analyze the opinion words identified by opinion word detector 126 to categorize the opinion words into opinion groups 238 without human input. In some embodiments, opinion grouper 134 may autonomously analyze the opinion words identified by opinion word detector 126 to categorize the opinion words into opinion groups 238 without further human input.

In some embodiments, opinion word detector 126 or opinion grouper 134 may also determine a polarity of the identified opinion words. For example, the opinion words may be determined to have a polarity of "positive", "neutral", or "negative." In some embodiments opinion word detector 126 or opinion grouper 134 may include or have access to one or more lists or databases of opinion words where, for example, each list or database may include opinion words of a particular polarity, e.g., "positive", "neutral" or "negative." In some embodiments, opinion word detector 126 or opinion grouper 134 may compare opinion words identified by opinion word detector 126 to the list or database for each polarity to determine the polarity of each opinion word. In some aspects, the determined polarity may be used as one of the dimensions for sampling the data.

LSAC extractor 136 is configured to analyze the sample 210, aspect categories 228, and opinion groupings 238 to generate context groupings 248 for each aspect category 228. Context groupings 248 associate the features of each aspect category 228 with the corresponding opinion from opinion groupings 238 based on sample 210. With reference again to FIGS. 2 and 3, for example, LSAC extractor 136 parses sample 210 to determine a latent semantic association context pairs between the entity 211/features 216 and associated opinions 222. For example, a context grouping 250 of the "overview" aspect category may include the context pairing 252 of the entity, e.g., "Product X" and the associated opinion, e.g., "good". In another example, a context grouping 254 of the "tasty" aspect category may include the context pairing 256 of "taste" and "crispy" and the context pairing 258 of "tomato flavour" and "strong". In another example, a context grouping 260 of the "price" aspect category may include the context pairing 262 of "price" and "affordable" and the context pairing 264 of "cost performance" and "great". In another example, a context grouping 266 of the "package" aspect category may include the context pairing 268 of "box" and "deformed" and the context pairing 270 of "edge" and "broken". In some embodiments, LSAC extractor 136 may autonomously analyze the sample 210, aspect categories 228, and opinion groupings 238 to generate context groupings 248 for each aspect category 228 without further human input.

With reference again to FIG. 2, the context pairings for each context grouping 248 may be determined by LSAC extractor 136, for example, based on sentence structure, punctuation marks, a number of words between each pair of words, or any similar way of determining associations between words. For example, each comma or pair of commas in sample 210 may be used to delimit the context of a statement. For example, entity 211, e.g., "Product X" and opinion word "good" can be found in sample 210 prior to the first comma 272. LSAC extractor 136 may determine that "Product X" and the opinion "good" are a context pairing 252 based on the location of the comma 272. Similarly, the feature "tastes" and opinion word "crispy" can be found in sample 210 between first comma 272 and second comma 274. LSAC extractor 136 may determine that "tastes" and "crispy" are a context pairing 256 based on the location of commas 272 and 274. Determinations of context pairings for the remaining features and opinions may be made in the same manner based on analysis of the sentence structure, punctuation marks, etc. found in sample 210.

Referring back to FIG. 1, informative sample selector 140 is configured to analyze the output of semantic generalizer 130 to generate a sentiment topic feature vector (STFV) for samples 110. Here, sentiment topic refers to the key sentiment information in the sentiment statement (e.g. opinion target/entity and its aspect category, opinion words and its semantic group, sentiment polarity, etc). Informative sample selector 140 may include a STFV constructor 142, an informative sample ranker 144, and a top K informative sample selector 146.

STFV constructor 142 is configured to generate a STFV 276 including one or more sentiment topics 278 as illustrated, for example, in FIG. 4. Each sentiment topic 278 may include, for example, an entity 280, a target aspect 282, an opinion 284, opinion group 286, and the corresponding LSAC 288. For example, "SentimentTopic7" includes the entity "box", target aspect "package", opinion "broken", opinion group "Group4", and the LSAC for "SentimentTopic7." In some embodiments, the LSAC for each sentiment topic 278 may correspond to the entity, target aspect, and opinion for that sentiment topic 278. For example, the LSAC for "SentimentTopic7" may be LSAC 266 from FIG. 3, "Context(package):={(box, deformed); (edge, broken)}", which includes the entity, target aspect, and opinion of the sentiment topic. In some embodiments, STFV constructor 142 may autonomously generate STFV 276 including one or more sentiment topics 278 without further human input.

Informative sample ranker 144 is configured to determine a ranking of the sample. For example, given a sample $s_i$, a set of key elements (e.g., feature, aspect, and opinion word) of the sample $s_i$ are $E=\{e_1, e_2, \ldots, e_n\}$ and a set of content words (e.g., all meaningful words including nouns, adjectives, verbs, etc.) of the sample $s_i$ are $W=\{w_1, w_2, \ldots, w_n\}$. In some aspects, the set of content words W does not include stop words, e.g., commonly used words such as "the", "a", "at", "be", "that", or other similar greats. A key element density $EleDensity(s_i)$ for the sample $s_i$ is the ratio of key elements $e_i$ and content words $w_i$ in the sample according to the following equation:

$$EleDensity(si) = \frac{\sum count(ei)}{\sum count(wi)}$$

A semantic diversity $Diversity(s_i)$ of new aspect categories in si may be determined according to the following equation:

$$Diversity(si) = \alpha * \frac{\sum count(newci)}{\sum count(ci)} + \beta * \frac{\sum count(newci)}{\sum count(ei)}$$

Where $\alpha$ is a weighting parameter for the aspect category ci and $\beta$ is a weighting parameter for the set of key elements ei. For example, α and β may be predetermined weighting values set by the system or by a user of the system.

The informative score InfoScore(si) for a sample $s_i$ may be generated according to the equation $\text{InfoScore}(s_i) = \alpha*\text{EleDensity}(s_i) + \beta*\text{Diversity}(s_i)$. In some embodiments, informative sample ranker 144 may autonomously determine a ranking of the sample without further human input.

Top K informative sample selector 146 may analyze the informative scores that are output by informative sample ranker 144 for each sample 110 and may select informative samples 150 to be included in a training corpus for training or customizing a sentiment analysis computer model. In some embodiments, for example, top K informative sample selector 146 may select only those samples 110 having informative scores above a pre-determined threshold. The pre-determined threshold may be set by the system or by a user of the system. In some embodiments, Top K informative sample selector 146 may autonomously analyze the informative scores that are output by informative sample ranker 144 for each sample 110 and select informative samples 150 to be included in a training corpus without further human input. In some embodiments, the selected informative samples may be ranked based on their informative scores. For example, a first sample having an informative score that is greater than a second sample may be ranked higher than the second sample, may be ranked lower than the second sample, or may be ranked in other similar manners based on the informative score.

Figure 5:
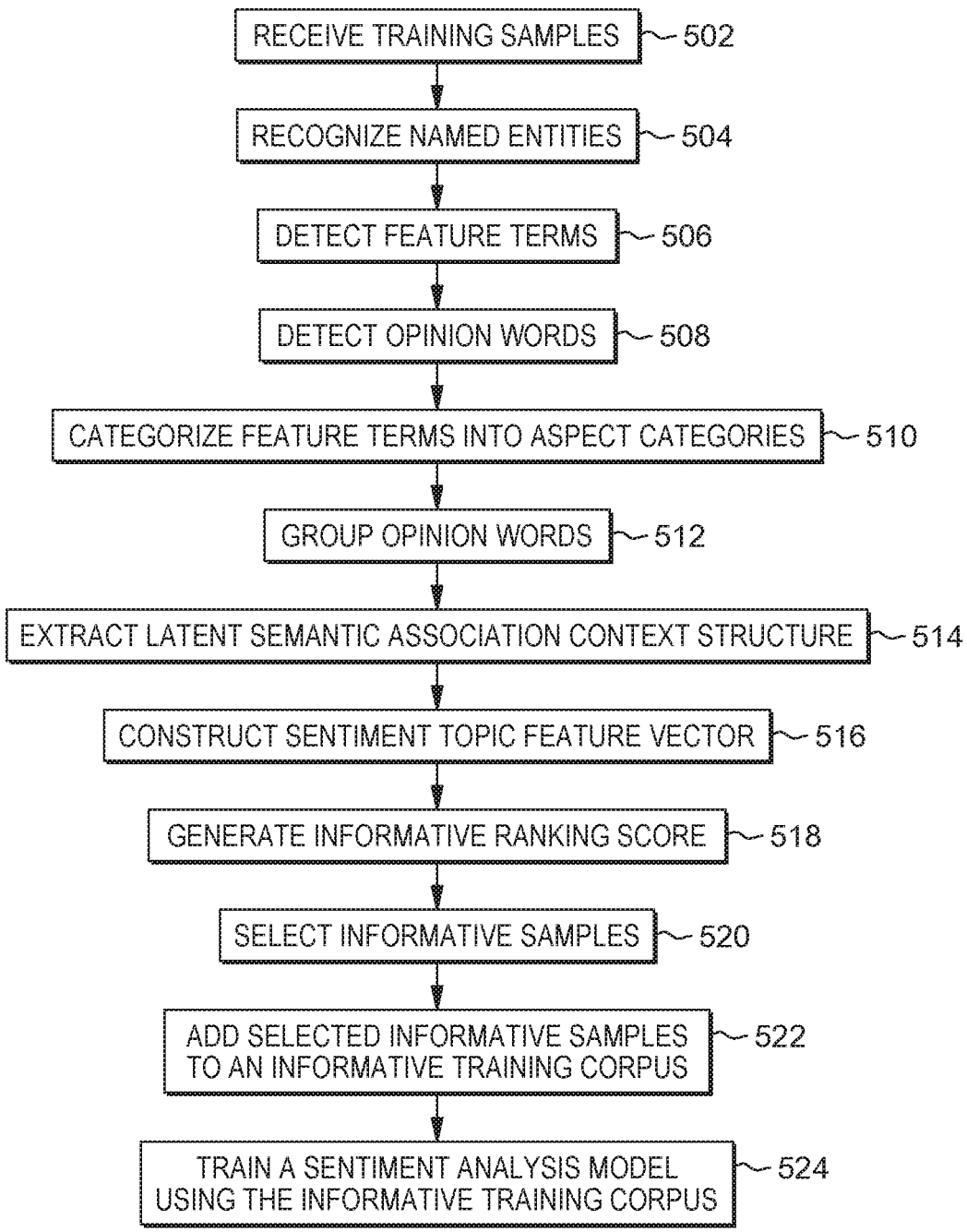
FIG. 5 is a flow chart illustrating a method of generating a training corpus in accordance with an embodiment of the present disclosure.

With reference now to FIG. 5, a method 500 that may be employed to generate an informative training corpus of samples for use in machine training a sentiment analysis computer model is illustrated. At 502, training samples 110 are received. At 504, named entity recognizer 122 analyzes one or more of the samples, for example, a sample 210 as described above with reference to FIGS. 2-4, to determine named entities in the one or more samples 110, for example, "Product X." At 506, feature term detector 124 analyzes the one or more of the samples 110 as described above to identify features of the samples, for example, taste, tomato flavor, price, cost performance, box, edge, etc. At 508, Opinion word detector 126 analyzes the samples 110 as described above to identify opinion words of the sample, for example, good, crispy, strong, affordable, great, deformed, broken, etc. At 510, aspect categorizer 132 categorizes the identified features by aspect as described above, for example, the aspect category "overview" may include "Product X", the aspect category "tasty" may include "taste" and "tomato flavor", the aspect category "price" may include "price" and "cost performance," the aspect category "package" may include "edge" and "box," etc. At 512, opinion grouper 134 groups the identified opinion words together as described above, for example, the opinion words "good" and "great" may be grouped in a first group, the opinion words "crispy" and "strong" may be grouped in a second group, the opinion word "affordable" may be grouped in a third group, and the opinion words "deformed" and "broken" may be grouped in a fourth group. At 514, the LSAC may be extracted for each aspect category as described above, for example, the LSAC for the "overview" aspect category may include the pairing "Product X", "good", the LSAC for the "tasty" category may include the pairing "taste", "crispy" and the pairing "tomato flavor", "strong", the LSAC for the "price" category may include the pairing "price, affordable" and the pairing "cost performance", "great", and the LSAC for the "package" category may include the pairing "box", "deformed" and the pairing "edge", "broken". At 516, sentiment topic feature vector constructor 142 constructs STFVs for the samples as described above. For example, a STFV may include a sentiment topic for each feature of the samples. For example, a semantic topic for the feature "taste" may include the feature "taste", the aspect category "tasty", the opinion word "crispy", opinion word group 2, and the LSAC for the aspect "tasty". At 518, informative sample ranker 144 generates informative ranking scores for the samples as described above, for example, by comparing the key element density and diversity of the samples. At 520, top k informative sample selector 146 selects informative samples for inclusion in the informative training corpus based on their informative ranking scores. At 522, the informative training corpus is generated from the selected informative training samples. In some embodiments, the informative training corpus may be generated autonomously where, for example, once samples 110 have been received, no further human input is required to generate informative samples 150.

In some embodiments, the informative training corpus may be stored in a database repository for later use. In some embodiments, the selected informative training samples or the generated informative training corpus may be added to or may update an existing informative training corpus that is already stored in the database repository. The database repository may, for example, be stored on system memory 16 (FIG. 6), storage system 18 (FIG. 6), in the cloud, on a remote server database, in a distributed database, or in any other storage system.

At 524, the informative training samples from the informative training corpus may be used to machine train a sentiment analysis computer model. The sentiment analysis computer model may be trained using machine learning techniques and tools including, for example, Support Vector Machine (SVM), Regularized Risk Minimization (RRM), deep learning techniques, and other similar machine learning techniques.

Figure 6:
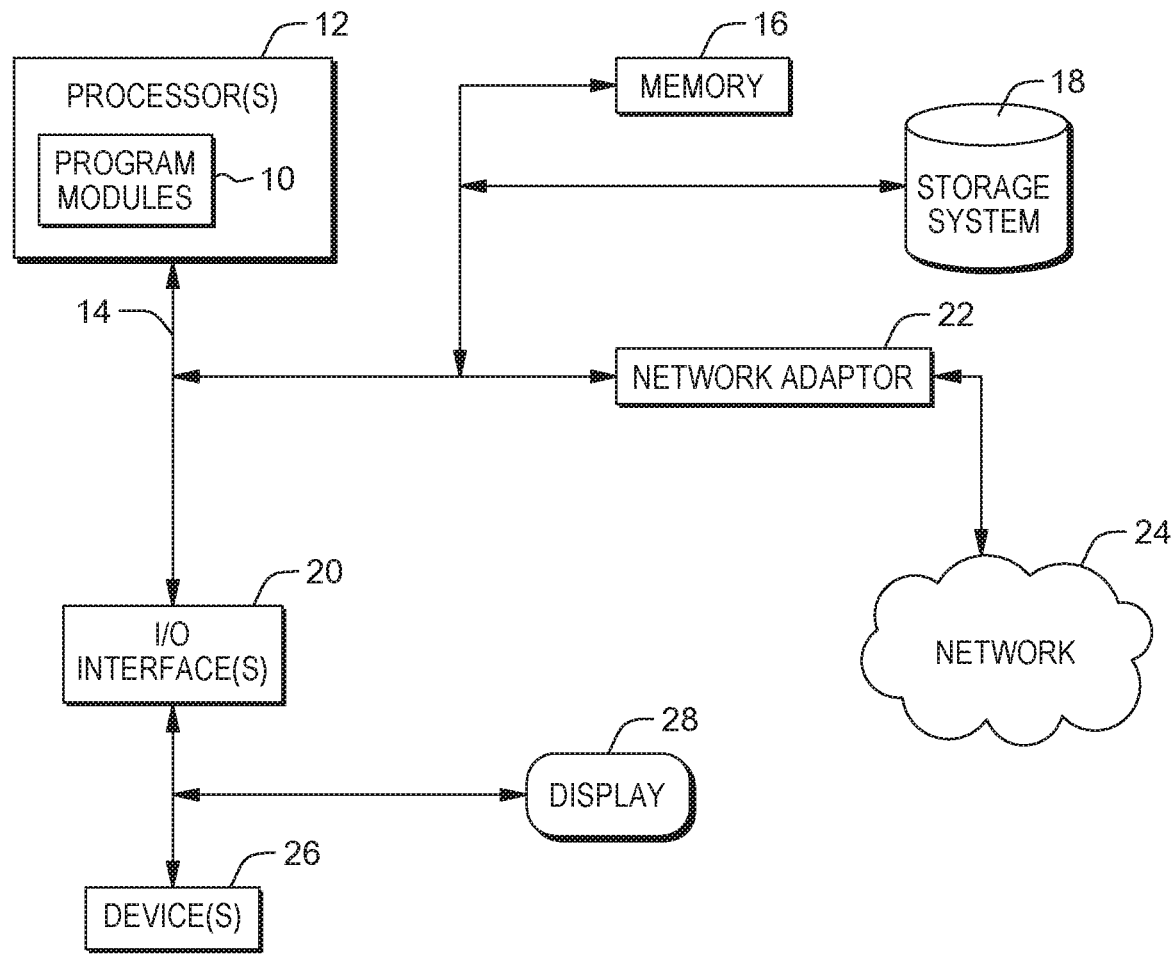
FIG. 6 illustrates a schematic of an example computer or processing system that may implement a system for generating a training corpus in accordance with an embodiment of the present disclosure.

FIG. 6 illustrates a schematic of an example computer or processing system that may implement a system for generating a training corpus of informative samples in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more program modules 10 that perform the methods described herein. The program modules 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method, comprising:
   receiving, by at least one processor, a plurality of training samples;
   extracting, by at least one processor, semantic and sentiment elements of one or more of the training samples;
   generalizing, by at least one processor, the extracted semantic and sentiment elements of the one or more of the training samples;
   generating, by at least one processor, an informative ranking score for one or more of the training samples based on the generalized semantic and sentiment elements, the informative ranking score generated as a function of a weighted element density associated with said one or more of the training samples and a weighted semantic diversity associated with said one or more of the training samples, wherein the weighted semantic diversity is determined as a sum of, a weighted ratio between aspect categories of a given training sample and all training samples being considered, and a weighted ratio between extracted elements of the given training sample and said all training samples being considered;

selecting, by at least one processor, informative training samples from the plurality of training samples based at least in part on the generated informative ranking scores;

adding, by at least one processor, the selected informative training samples to an informative training corpus; and machine training a semantic analysis computer model using the informative training corpus.

2. The method of claim 1, wherein extracting semantic and sentiment elements from one or more of the training samples includes, for each of the one or more of the training samples:
   analyzing the training sample to identify an entity that is the subject of the training sample;
   analyzing the training sample to identify one or more feature terms of the training sample; and
   analyzing the training sample to identify one or more opinion words of the training sample.

3. The method of claim 2, wherein generalizing the extracted semantic and sentiment elements of the one or more of the training samples includes, for each of the one or more training samples:
   categorizing the identified entity and feature terms into one or more aspect categories;
   grouping the identified opinion words into one or more opinion word groups; and
   extracting a latent semantic association context structure for one or more of the aspect categories.

4. The method of claim 3, wherein generating the informative ranking score for the one or more of the training samples includes, for each of the one or more training samples:
   constructing a sentiment topic feature vector for the training sample based on at least one of the identified entity, the identified feature terms, the identified opinion words, the one or more aspect categories, the one or more opinion word groups, and the latent semantic association context for the one or more aspect categories; and
   generating an informative ranking score for the training sample based at least in part on the generated sentiment topic feature vector.

5. The method of claim 3, wherein the latent semantic association context structure comprises one or more context pairs, each pair comprising:
   at least one of the identified entity and one of the feature terms; and
   an opinion word.

6. The method of claim 1, wherein the extracting, generalizing, generating, selecting, and adding are performed autonomously.

7. A system, comprising:
   at least one hardware processor programmed to:
   receive a plurality of training samples;
   extract semantic and sentiment elements of one or more of the training samples;
   generalize the extracted semantic and sentiment elements of the one or more of the training samples;
   generate an informative ranking score for one or more of the training samples based on the generalized semantic and sentiment elements, the informative ranking score generated as a function of a weighted element density associated with said one or more of the training samples and a weighted semantic diversity associated with said one or more of the training samples, wherein the weighted semantic diversity is determined as a sum of, a weighted ratio between aspect categories of a given training sample and all training samples being considered, and a weighted ratio between extracted elements of the given training sample and said all training samples being considered;
   select informative training samples from the plurality of training samples based at least in part on the generated informative ranking scores;
   add the selected informative training samples to an informative training corpus; and
   a storage device coupled to the at least one hardware processor,
   wherein the at least one hardware processor is further programmed for machine training a semantic analysis computer model using the informative training corpus.

8. The system of claim 7, wherein to extract the semantic and sentiment elements from one or more of the training samples, for each of the one or more of the training samples, the at least one hardware processor:
   analyzes the training sample to identify an entity that is the subject of the training sample;
   analyzes the training sample to identify one or more feature terms of the training sample; and
   analyzes the training sample to identify one or more opinion words of the training sample.

9. The system of claim 8, wherein to generalize the extracted semantic and sentiment elements of the one or more of the training samples, for each of the one or more training samples, the at least one hardware processor:
   categorizes the identified entity and feature terms into one or more aspect categories;
   groups the identified opinion words into one or more opinion word groups; and
   extracts a latent semantic association context structure for one or more of the aspect categories.

10. The system of claim 9, wherein to generate the informative ranking score for the one or more of the training samples, for each of the one or more training samples, the at least one hardware processor:
    constructs a sentiment topic feature vector for the training sample based on at least one of the identified entity, the identified feature terms, the identified opinion words, the one or more aspect categories, the one or more opinion word groups, and the latent semantic association context for the one or more aspect categories; and
    generates an informative ranking score for the training sample based at least in part on the generated sentiment topic feature vector.

11. The system of claim 9, wherein the latent semantic association context structure comprises one or more context pairs, each context pair comprising:
    at least one of the identified entity and one of the feature terms; and
    an opinion word.

12. The system of claim 7, wherein the at least one hardware processor performs extracting, generalizing, generating, selecting, and adding autonomously.

13. A computer program product comprising a computer readable storage medium having program instructions embodied therewith, wherein the computer readable storage medium is not a transitory signal per se, the program instructions readable by a processor to cause the processor to perform a method comprising:
receiving a plurality of training samples;
extracting semantic and sentiment elements of one or more of the training samples;
generalizing the extracted semantic and sentiment elements of the one or more of the training samples;
generating an informative ranking score for one or more of the training samples based on the generalized semantic and sentiment elements, the informative ranking score generated as a function of a weighted element density associated with said one or more of the training samples and a weighted semantic diversity associated with said one or more of the training samples wherein the weighted semantic diversity is determined as a sum of, a weighted ratio between aspect categories of a given training sample and all training samples being considered, and a weighted ratio between extracted elements of the given training sample and said all training samples being considered;
selecting informative training samples from the plurality of training samples based at least in part on the generated informative ranking scores;
adding the selected informative training samples to an informative training corpus; and
machine training a semantic analysis computer model using the informative training corpus.

14. The computer program product of claim 13, wherein the extracting of the semantic and sentiment elements from one or more of the training samples includes, for each of the one or more of the training samples:
analyzing the training sample to identify an entity that is the subject of the training sample;
analyzing the training sample to identify one or more feature terms of the training sample; and
analyzing the training sample to identify one or more opinion words of the training sample.

15. The computer program product of claim 14, wherein the generalizing of the semantic and sentiment elements of the one or more of the training samples includes, for each of the one or more training samples:
categorizing the identified entity and feature terms into one or more aspect categories;
grouping the identified opinion words into one or more opinion word groups; and
extracting a latent semantic association context structure for one or more of the aspect categories.

16. The computer program product of claim 15, wherein the generating of the informative ranking score for the one or more of the training samples includes, for each of the one or more training samples:
constructing a sentiment topic feature vector for the training sample based on at least one of the identified entity, the identified feature terms, the identified opinion words, the one or more aspect categories, the one or more opinion word groups, and the latent semantic association context for the one or more aspect categories; and
generating an informative ranking score for the training sample based at least in part on the generated sentiment topic feature vector.

17. The computer program product of claim 13, wherein the extracting, generalizing, generating, selecting, and adding are performed autonomously.

18. The method of claim 1, further comprising:
storing, by at least one processor, the informative training corpus in a database repository on a storage device.

19. The system of claim 8, wherein the at least one hardware processor is programmed to store the informative training corpus in a database repository on the storage device.

20. The computer program product of claim 13, wherein the method further comprises storing the informative training corpus in a database repository on a storage device.

* * * * *